Fig. 3-1
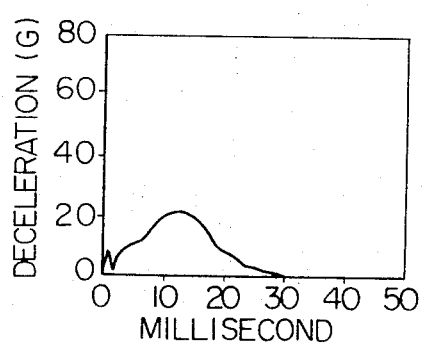
A. TEMPERED (CONTROL)
VELOCITY 6.8 Km/h
UNBROKEN
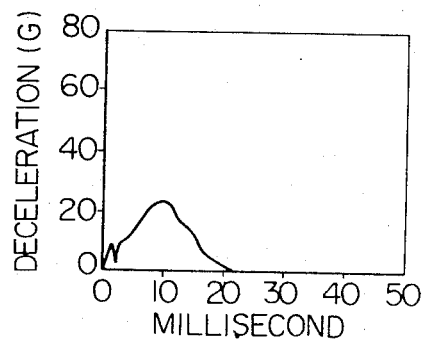
B. LAMINATED (CONTROL)
VELOCITY 6.5 Km/h
UNBROKEN
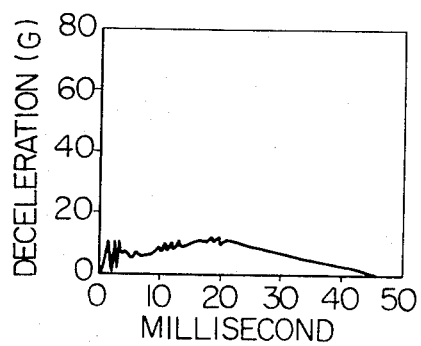
C. NSG-X LAMINATED
VELOCITY 6.6 Km/h
BROKEN

Fig. 3-2
A. TEMPERED (CONTROL)
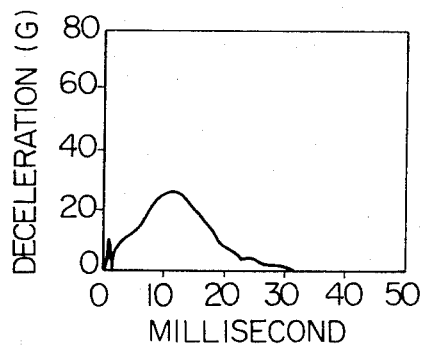
VELOCITY 8.1 Km/h
UNBROKEN
B. LAMINATED (CONTROL)
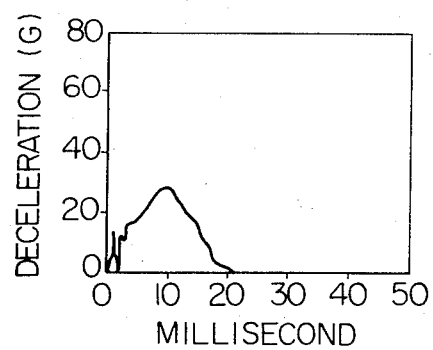
VELOCITY 7.7 Km/h
UNBROKEN
C. NSG-X LAMINATED
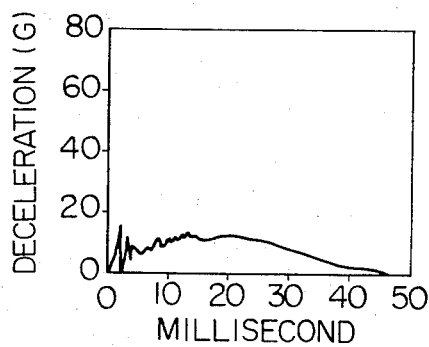
VELOCITY 8.0 Km/h
BROKEN

A. TEMPERED (CONTROL)

VELOCITY 11.8 Km/h
UNBROKEN

B. LAMINATED (CONTROL)

VELOCITY 11.7 Km/h
BROKEN

C. NSG-X LAMINATED

VELOCITY 12.1 Km/h
BROKEN

Fig. 3-4
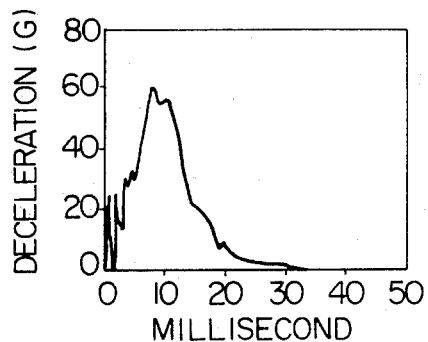
A. TEMPERED (CONTROL)
VELOCITY 15.2 Km/h
UNBROKEN
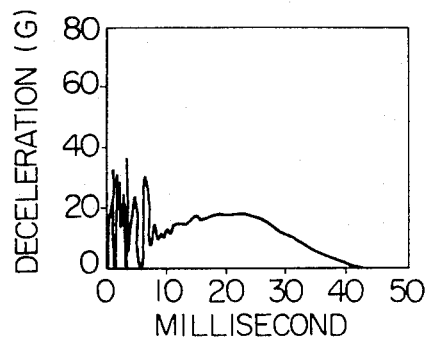
B. LAMINATED (CONTROL)
VELOCITY 15.2 Km/h
BROKEN
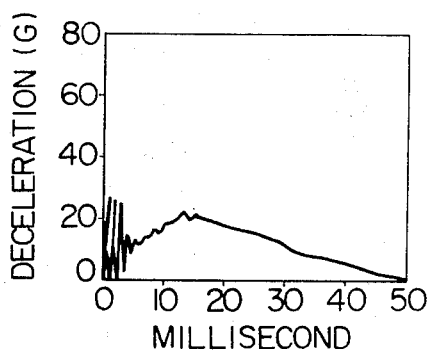
C. NSG-X LAMINATED
VELOCITY 15.5 Km/h
BROKEN

United States Patent Office 3,798,113
Patented Mar. 19, 1974

3,798,113
LAMINATED WINDSHIELD STRUCTURE
Joji Suzuki and Keihachiro Tanaka, Hyogo-ken, Japan, assignors to Nippon Sheet Glass Co., Ltd., Osaka, Japan
Application June 6, 1971, Ser. No. 153,888, which is a continuation of abandoned application Ser. No. 780,419, Dec. 2, 1968. Divided and this application Aug. 9, 1971, Ser. No. 170,154
Claims priority, application Japan, Dec. 7, 1967, 42/78,813
Int. Cl. B32b 5/14, 17/10
U.S. Cl. 161—164       5 Claims

ABSTRACT OF THE DISCLOSURE

A laminated windshield structure has at least two transparent glass sheets and at least one interlayer of an organic polymeric material interposed between the glass sheets and bonded thereto to provide a unitary structure. At least one of said glass sheets has at least one surface with a $Li^+$ ion concentration higher than that of the interior of the glass sheet and a $Na^+$ ion concentration lower than that of the interior of the glass sheet. The one glass sheet is under a tensile stress for giving said glass sheet a reduced impact strength lower than the normal impact strength of a glass sheet of the same thickness and size.

---

Figure 1:
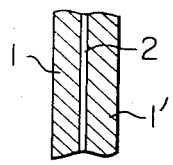

This application is a division of Ser. No. 153,888, filed June 16, 1971 which is a continuation of application Ser. No. 780,419, filed Dec. 2, 1968, and now abandoned.

This invention relates to a laminated glass, particularly one for use as a windshield of an automobile.

In recent years, the number of the wounded and dead in automobile accidents has been on the increase with the increasing number of automobiles used, and there has been a strong demand for the safety in automobiles. As regards windshields of automobiles, the demands are that at the time of collision, the driver's head should not receive a high impact of the glass, and should not easily penetrate through the glass.

The problem of penetration at the time of collision was solved to some extent when a safety laminated glass having a high penetration resistance was proposed. The proposal provided a laminated glass consisting of two glass sheets and an interlayer of an organic polymeric material disposed between the glass sheets and bonded thereto, and contemplated increasing the thickness of the interlayer, particularly an interlayer of polyvinyl butyral, and decreasing of the bonding force between the interlayer and each glass sheet (see, for instance, U.S. Pats. Nos. 2,946,711; 3,231,461 and 3,249,487).

The object of this invention is to provide a novel laminated glass which does not give a high impact to the driver's head at the time of collision. When the driver's head has a sudden collision with the windshield glass, the head receives a high impact, resulting in cerebral concussion and unconsciousness. This is likely to lead to a bigger accident, and sometimes give rise to sequelae.

The invention provides a laminated structure comprising at least two transparent glass sheets and at least one interlayer of an organic polymeric material interposed between the glass sheets and bonded thereto to provide a unitary structure, at least one of said glass sheets having at least one surface with a $Li^+$ ion concentration higher than that of the interior of the glass sheet, a $Na^+$ ion concentration lower than that of the interior of the glass sheet, and a tensile stress in at least a layer at said one surface for giving said glass sheet a reduced impact strength lower than the normal impact strength of a glass sheet of the same thickness and size.

The glass sheet which forms a member of the windshield structure according to the invention and the $Na^+$ ion concentration and $Li^+$ ion concentration of which is different at the surface of the glass sheet from the interior can be produced by contacting both, or preferably one of the surfaces of a glass sheet with a molten lithium salt such as lithium nitrate, thereby replacing a part of the $Na^+$ ions at the glass surface by $Li^+$ ions. If desired, other salt such as potassium salt may be blended with a lithium salt to provide a bath having a lower melting point. For example, a mixture of 40 mole percent of lithium nitrate and 60 mole percent of potassium nitrate melts at about 140° C. The velocity of ion exchange depends greatly upon the temperature of bath, and when the temperature is high, the surface of the glass soon becomes opaque. If, therefore, the treatment temperature is lowered, the surface treatment procedure for reducing the impact strength of glass becomes easier. In this case, the temperature of the molten salt bath may be from about 150° C. to about 270° C., preferably from about 180° C. to about 250° C. The time of contact depends on the temperature of the salt bath and the desired degree of reduction on strength, but should preferably not exceed about 60 minutes when the temperature of the salt is 210° C. A glass sheet treated by this method has a surface having an inwardly increasing $Na^+$ ion concentration and an inwardly decreasing $Li^+$ ion concentration and a layer which is under a tensile stress is formed.

The strength of a surface-treated sheet glass is measured by the following test method A or B.

Test A (Ring Bending Test)

This test method is usually called a ring bending strength measuring method. A glass sheet with a size of 50 mm. x 50 mm. is placed on a hollow cylinder having a diameter of 24 mm. A hollow cylinder having a diameter of 12 mm. is urged against the glass sheet from above, and a load is exerted until the glass sheet breaks. The strength of the glass sheet is calculated from the following equation $$X = 0.4 \times \frac{p}{h^2}$$

wherein $h$ is the thickness of the glass sheet, and $p$ is a load at the time of breakage of the glass sheet.

Test B (Ball Dropping Test)

The test is conducted with respect to a specimen having a size of 30 cm. x 30 cm.

The injured specimen is supported on two sides, and is destroyed by letting a steel ball having a weight of 180 gr. fall from a height of 2.6 m. above the specimen. The velocity of the steel ball immediately before the collison, which is referred to as $V_1$, is $\sqrt{2 \text{ g.} \times 2.6 \text{ m.}} = 716$ cm./sec. A camera is set beside the specimen. Positions of the ball before and after collision are illuminated by a stroboscopic flash (200 cycles/sec.), and photographed on one piece of film. In an enlarged photograph, the distance between two positions of the ball which are nearest to the glass sheet before collision is measured and referred to as $l_1$. Likewise, the distance between two positions of the ball which are nearest to the glass sheet after collision is measured, and referred to as $l_2$. The velocity of the ball immediately after the collision, which is referred to as $V_2$, is approximately $$\frac{l_2}{l_1} \times V_1$$

The differencene between the momentum before the collision and that after the collision can be calculated from $V_1$ and $V_2$ by the formula $$\Delta mV = m(V_1 - V_2)$$

wherein $m$ is the weight of the steel ball (180 gr.).

When a pre-treated specimen is tested according to Test A or Test B, the surface of the specimen opposite to the surface subjected to a load or impact shock should be the treated surface.

It is preferable that surface treated glass sheet to be used in the manufacture of the laminated structure of the invention should have a strength, as measured by the foregoing Test A, of not more than about 6.0 kg./mm.$^2$ and an impact strength, as measured by the foregoing Test B of not more than about 550 g.m./sec.

Figure 2:
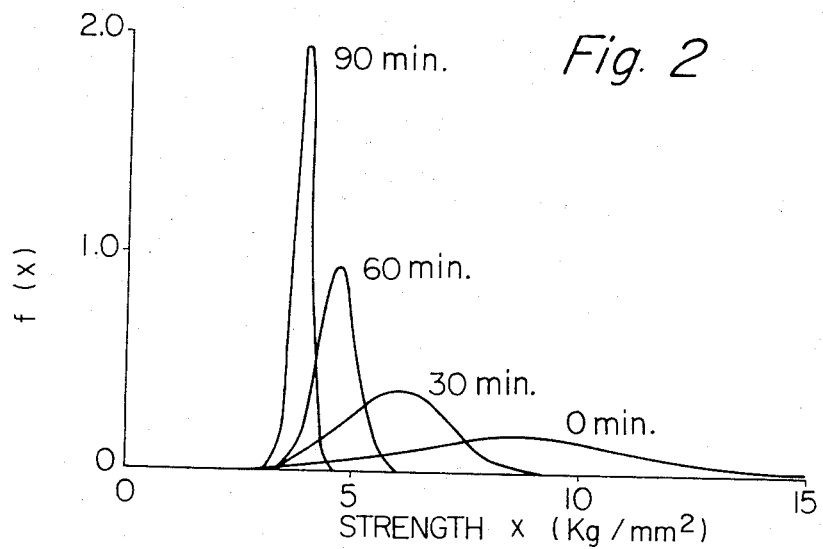
Figure 3:
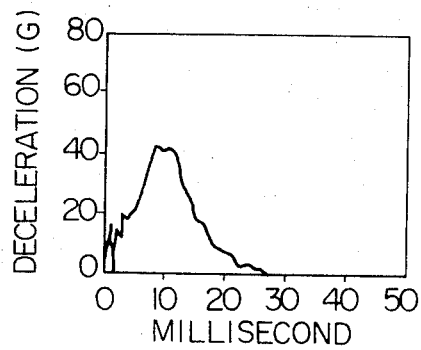
Figure 3:
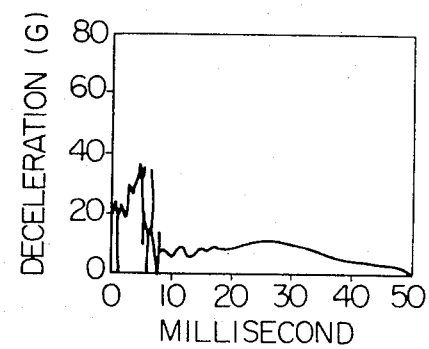
Figure 3:
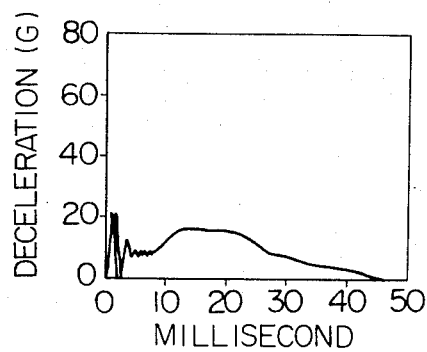

In the drawings, FIG. 1 is a sectional view illustrating one example of a safety laminated glass according to the invention. FIG. 2 shows reduction in the strength of a sheet glass immersed in a molten salt bath (40 mole percent of LiNO$_3$ and 60 mole percent of KNO$_3$) at 210° C.; and FIGS. 3-1 to 3-4 are illustrative of results of impact tests with respect to various windshields.

In FIG. 1, at least one of transparent glass sheets 1 and 1' has a reduced impact strength due to pretreatment of its surface. An interlayer 2 of an organic polymeric material is interposed between the sheets 1 and 1' and bonded thereto to provide a unitary structure. The interlayer 2 is not the subject matter of the present invention, but should preferably be one as proposed heretofore which provides a high penetration resistance. Advantageously, both the glass sheets 1 and 1' have a reduced impact strength. In the most preferred embodiment of the invention, each of the glass sheets 1 and 1' is untreated on the surface confronting the driver, but is subjected at the other surface to a treatment for reducing the impact strength.

When the driver's head collides strongly with a laminated windshield glass, a compression layer occurs on that surface of each glass sheet which confronts the driver, and a tension layer occurs on the other side. If the glass surface on the side away from the driver is weakened, the glass is easily broken by tension generated owing to collision. Conversely, when an object outside collides with the laminated windshield glass, a tension layer occurs on that surface of each glass sheet which confronts the driver, and a compression layer is formed on the other side. At this time, the treated surface of the glass sheet undergoes compression, and therefore, the glass sheet is more difficult to break than in the case of collision of the driver's head therewith. When the driver's head hits the laminated glass of the invention at the time of collision, the glass sheet is readily broken, because a sheet glass having a reduced strength is used to make the laminated glass. When the sheet glass is broken, the energy of the collision is gradually absorbed into the interlayer, and therefore, the head receives less impact.

FIG. 2 shows changes in the strength of a glass sheet having a thickness of 3 mm. and an area of 50 mm. x 50 mm. when immersed in a molten salt bath (40 mole percent LiNO$_3$ and 60 mole percent of KNO$_3$) at 210° C. Each specimen is immersed in said molten salt for a certain period of time (30, 60 or 90 minutes), and then withdrawn from the bath. It is cooled, washed with water, and dried, and its strength is measured by the above-mentioned Test A. Fifteen specimens were tested with respect to each immersing time, and their strength ($x$) is measured. FIG. 2 is a graph with normal distribution showing the results obtained with respect to each immersing time and those obtained for non-treated specimens. The abscissa represents strength ($x$), and the ordinate, a probability density function of $x$ $$f(x) = \frac{1}{\sigma\sqrt{2\pi}} \exp\left[-\frac{(x-\bar{x})^2}{2\sigma^2}\right]$$

where $\bar{x}$ is an average value of the specimens and $\sigma$ is a standard deviation of the specimens.

When a glass sheet is contacted with a molten bath of lithium salt, Na$^+$ ions in a surface layer of the glass sheet are replaced with Li$^+$ ions having a smaller volume, and consequently, the strength of the glass sheet is reduced. In the examples, an untreated glass sheet has a strength on an average of 8.5 kg./mm.$^2$, but when subjected to the treatment according to the invention for 30, 60 and 90 minutes, it comes to have a reduced strength, on an average, of 6.0, 4.7 and 3.8 kg./mm.$^2$, respectively.

The transparency of the specimen is decreased with an increase in the treating time, but a heat-treatment for 60 minutes at 210° C. does not impair the transparency.

FIGS. 3-1 to 3-4 show the results of collision tests of various windshield glass sheets. The following three windshield glass sheets are prepared. Their sizes are 530 mm. x 1300 mm.

(A) Tempered (control): A glass sheet having a thickness of 5 mm. is heated for 5 minutes in a furnace at 650-720° C. It is then taken out and quenched by blowing cold air against the glass surface.

(B) Laminated (control): A laminated glass consisting of two 3 mm. thick, glass sheets and an interlayer of polyvinyl butyral having a thickness of 0.76 mm. is prepared. Each glass sheet has a strength according to Test A of 8.5 kg./mm.$^2$ and a strength according to test B of 850 g.m./sec. These values are an average for 15 specimens.

(C) NSG-X laminated (ion-exchange): Same as specimen B except that each glass sheet is subjected to a strength reduction pre-treatment comprising contacting only one surface of each glass sheet with a molten salt bath (40 mole percent LiNO$_3$ and KNO$_3$ 60 mole percent) at 220° C. $\mp$5° C. for 60 minutes, and has a strength according to Test A of 4.5 kg./mm. (average of 15 specimens). Furthermore, each glass sheet is subjected to the strength reduction treatment on the surface farther from the driver.

The test is conducted in the following way. Each specimen is vertically fixed. An impact body with a total weight of 10 kg. having a circular tip covered with hard rubber is discharged by a coil spring and caused to collide with the surface of the specimen which confronts the driver, at a collision angle of 90°. The impact behavior is examined. The velocity of the impact body is measured by the connection of a photoelectric relay and an electromagnetic oscillograph in terms of the time needed for travel a predetermined distance. The deceleration which the specimen undergoes at the time of collision is sensed by an acceleration seismometer housed within the impact body, and is recorded in a memory type Braun tube oscilloscope via an amplifier.

The test results are shown in FIGS. 3-1 to 3-4.

FIGS. 3-1 to 3-4 show impact behaviors of three windshield glasses at each impact velocity. The ordinate represents deceleration (G), and the abscissa represents time in millisecond. The impact velocity and the breakage of the specimen by impact are also indicated in these figures.

It is seen from FIGS. 3-1 to 3-4 that specimen A (control) is not broken even at an impact velocity of 15.2 km./h., and the maximum deceleration at this time reaches 60 G, being indicative of a great danger. In contrast, specimen B (control) is safer, but its maximum deceleration reaches about 30 G at an impact velocity of 7.7 km./h. The danger of impact at the time of collision is not yet removed. On the other hand, it has been found that the glass sheets of specimen C according to the invention are broken even at a low impact velocity, and the collision energy is gradually absorbed by the interlayer. It is also seen from the results of these tests that specimen B (control), even when the glass is broken, takes a longer time (about 8 milliseconds) to break than specimen C according to the present invention, and that it has a higher deceleration, and the danger of impact at the time of collision is not yet removed.

What is claimed is:

1. A laminated windshield structure comprising at least two transparent glass sheets and at least one interlayer of an organic polymeric material interposed between the glass sheets and bonded thereto to provide a unitary structure, at least one of said glass sheets having at least one surface with a Li+ ion concentration higher than that of the interior of the glass sheet, a Na+ ion concentration lower than that of the interior of the glass sheet, and a tensile stress for giving said glass sheet a reduced impact strength lower than the normal impact strength of a glass sheet of the same thickness and size, said one of said glass sheets having a strength, as measured by the ring bending test, of not more than about 6.0 kg./mm.²

2. A laminated windshield structure as claimed in claim 1, wherein said one transparent glass sheet is the glass sheet on side of the windshield which will face the driver of a vehicle in which the windshield is mounted.

3. A laminated windshield structure as claimed in claim 1, wherein each of said transparent glass sheets has one surface having a Na+ ion concentration lower than that of the interior of the glass sheet and a Li+ ion concentration higher than the interior of the glass sheet, said one surface facing away from the driver of a vehicle in which the windshield is mounted.

4. A laminated windshield structure as claimed in claim 1 wherein said one of said glass sheets has an impact strength, as measured by the ball dropping test, of not more than about 550 g. m./sec.

5. A laminated windshield structure as claimed in claim 1 wherein said structure has an impact strength such that when an impact body with a total weight of 10 kg. having a circular tip covered with hard rubber is impinged against the structure from the driver's side at an angle of 90° and at a velocity of about 12 km./hr., the maximum deceleration velocity of the impact body does not exceed about 20 G.

References Cited
UNITED STATES PATENTS

| | | | |
|---|---|---|---|
| 2,946,711 | 7/1960 | Bragaw, Jr., et al. | 161—199 |
| 3,282,772 | 11/1966 | Davis, Sr. | 161—165 |
| 3,396,075 | 8/1968 | Morris | 161—199 |
| 2,779,136 | 1/1957 | Hood et al. | 65—30 X |
| 3,473,997 | 10/1969 | Howitt | 161—192 |
| 3,287,201 | 11/1966 | Chisholm, et al. | 161—1 |

DANIEL J. FRITSCH, Primary Examiner

U.S. Cl. XR.

156—106; 161—192, 199